United States Patent
Kilroy et al.

(10) Patent No.: US 9,646,327 B2
(45) Date of Patent: May 9, 2017

(54) DISAGGREGATION TO ISOLATE USERS FOR AD TARGETING

(75) Inventors: Jonathan Kilroy, Champaign, IL (US); Dale Nussel, Mahomet, IL (US); Anupam Seth, Urbana, IL (US); Allie K. Watfa, Urbana, IL (US)

(73) Assignee: Yahoo! Inc., Sunnyvale, CA (US)

( * ) Notice: Subject to any disclaimer, the term of this patent is extended or adjusted under 35 U.S.C. 154(b) by 274 days.

(21) Appl. No.: 13/206,302

(22) Filed: Aug. 9, 2011

(65) Prior Publication Data
US 2013/0041757 A1 Feb. 14, 2013

(51) Int. Cl.
G06Q 30/00 (2012.01)
G06Q 30/02 (2012.01)

(52) U.S. Cl.
CPC ................ G06Q 30/0269 (2013.01)

(58) Field of Classification Search
USPC .......................... 705/14.52, 14.53
See application file for complete search history.

(56) References Cited

U.S. PATENT DOCUMENTS

| | | | | |
|---|---|---|---|---|
| 7,383,243 | B2 * | 6/2008 | Conkwright et al. | 725/2 |
| 8,060,463 | B1 * | 11/2011 | Spiegel | G06Q 30/02 707/609 |
| 8,223,955 | B2 * | 7/2012 | Pounds | G06Q 30/0251 379/114.13 |
| 2002/0123928 | A1 * | 9/2002 | Eldering | G06Q 30/02 705/14.52 |
| 2004/0176992 | A1 * | 9/2004 | Santos | G06Q 10/0639 705/7.33 |
| 2007/0208670 | A1 * | 9/2007 | Quoc | G06F 21/10 705/59 |
| 2008/0040175 | A1 * | 2/2008 | Dellovo | G06Q 10/0637 705/7.36 |
| 2008/0065759 | A1 * | 3/2008 | Gassewitz | G06Q 30/02 709/224 |
| 2008/0140523 | A1 * | 6/2008 | Mahoney | G06Q 30/0256 705/14.54 |
| 2009/0018920 | A1 * | 1/2009 | Lerman | G06Q 30/00 705/14.66 |
| 2009/0119717 | A1 * | 5/2009 | Newton | G06F 17/30796 725/59 |
| 2009/0171749 | A1 * | 7/2009 | Laruelle et al. | 705/10 |
| 2009/0171760 | A1 * | 7/2009 | Aarnio | G06Q 30/02 705/14.66 |
| 2010/0058383 | A1 * | 3/2010 | Chang | G06Q 30/02 725/35 |
| 2010/0095215 | A1 * | 4/2010 | Elven | G06Q 30/02 715/736 |
| 2010/0205057 | A1 * | 8/2010 | Hook et al. | 705/14.52 |
| 2010/0223641 | A1 * | 9/2010 | Hubbard | G06Q 30/02 725/35 |
| 2010/0250714 | A1 * | 9/2010 | Wehmann | G06Q 30/02 709/220 |

(Continued)

Primary Examiner — Matthew T Sittner
(74) Attorney, Agent, or Firm — Cooper Legal Group, LLC

(57) ABSTRACT

Targeting advertisements to a specific user includes steps or acts of: identifying an area of interest that includes a plurality of users using the Internet; logging each Internet request from the plurality of users; aggregating data regarding each Internet request to reveal use patterns; and disaggregating the data according to the use patterns to match the Internet use pattern with the specific user, thus identifying the specific user with each Internet request.

20 Claims, 4 Drawing Sheets

(56) References Cited

U.S. PATENT DOCUMENTS

| | | | |
|---|---|---|---|
| 2011/0015989 A1* | 1/2011 | Tidwell et al. | 705/14.43 |
| 2011/0047072 A1* | 2/2011 | Ciurea | G06Q 20/10 |
| | | | 705/39 |
| 2011/0125594 A1* | 5/2011 | Brown | G06Q 30/02 |
| | | | 705/14.73 |
| 2012/0054010 A1* | 3/2012 | Bouta | G06Q 30/0214 |
| | | | 705/14.16 |
| 2012/0158461 A1* | 6/2012 | Aldrey | G06Q 30/0201 |
| | | | 705/7.35 |
| 2013/0041757 A1* | 2/2013 | Kilroy | G06Q 30/0269 |
| | | | 705/14.66 |

\* cited by examiner

400

| Time | Websites | Device | App Use | App Organization |
|---|---|---|---|---|
| 10:00 - 10:15 | Yahoo! Home Page | PC | McAfee | Anti-virus on start-up |
| 10:15 - 10:25 | Sports | PC | | Sports site second |
| 15:00 - 15:30 | ITunes | PC | ITunes | ITunes for an extended period of time |
| 18:40 - 19:30 | Y! Finance | PC | E*Trade | On-line banking accessed |
| 09:00 - 09:20 | Gmail, Amazon | PC | Email | Email, then shopping |

| User | Trends | Familiar Links | App Use | Time of usual log in |
|---|---|---|---|---|
| A0 | Yahoo! home page, then sports, then movies | Y!, Amazon, shop | Entourage | 2 - 3 PM UTC |
| A1 | Start with Gmail, then Y! Fantasy Sport | G, Facebook, Twitter | BearShare | All Day |
| A2 | Y! Finance, then Amazon | Shop.com | MacAfee | All AM |
| A3 | ITunes connect | Chairs.com | ITunes | 10 - 12 AM |
| | | | | |

*FIG. 5*

DISAGGREGATION TO ISOLATE USERS FOR AD TARGETING

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of on-line advertising, and more particularly relates to the field of directed advertisement targeting.

BACKGROUND OF THE INVENTION

With the advent of multiple Internet access devices such as tablets, mobile phones, laptops, connected TVs, gaming consoles, and regular PCs, today's users are able to connect to the Internet from various locations and at various times, not just at the office. Today almost every household, coffee shop, library, hotel, and airport provides easy and [often] free Internet access. Having one shared device for many users is presently very common. In fact, the average household includes multiple Internet users sharing one gateway. In cases where users are not required to log in to a login profile, targeted ads are impossible.

Therefore, there is a need for a system and method of targeting ads to specific users in order to overcome the shortcomings of the known art.

SUMMARY OF THE INVENTION

Briefly, according to an embodiment of the invention a method for targeting advertisements to a specific user includes steps or acts of: identifying an area of interest that includes a plurality of users using the Internet; logging each Internet request from the plurality of users; aggregating data regarding each Internet request to reveal use patterns; and disaggregating the data according to the use patterns to match the Internet use pattern with the specific user, thus identifying the specific user with each Internet request.

According to another embodiment of the present invention, an information processing system for directed ad targeting includes: a memory; and a processor device operably coupled with the memory and executing instructions to: identify an area of interest that includes a plurality of users using the Internet; log each Internet request from the plurality of users; aggregate data regarding each Internet request to reveal use patterns; and disaggregate the data according to the use patterns to match the Internet use pattern with the specific user, thus identifying the specific user with each Internet request.

According to another embodiment of the present invention, the method for targeting advertisements to a specific user is performed from instructions on a non-transitory computer readable medium.

The method can also be implemented as machine executable instructions executed by a programmable information processing system or as hard coded logic in a specialized computing apparatus such as an application-specific integrated circuit (ASIC).

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 4 is a sample access log, according to an embodiment of the present invention;

FIG. 5 is a sample master log, according to an embodiment of the present invention.

Figure 1:
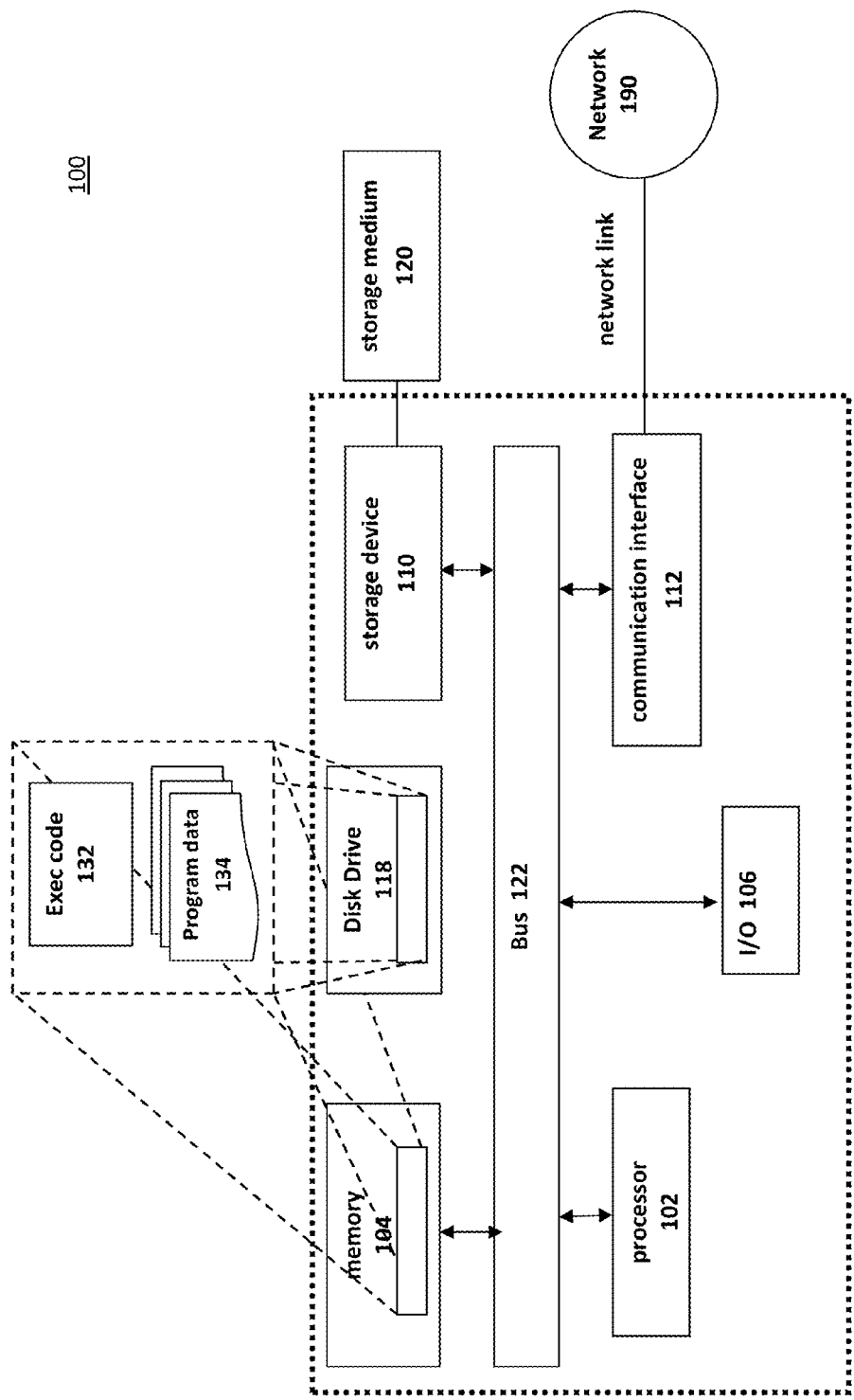
FIG. 1 is a high level block diagram showing an information processing system configured to operate according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a system and method for identifying and targeting specific users by the disaggregation and disambiguation of aggregated data from one device used by multiple users, or multiple devices used from within one gateway (for example, from within an Internet café). We are able to identify which specific user is accessing the device so that relevant, targeted advertisements can be served to that specific user.

Benefits and Advantages of the Invention.

We enable more personalized ad targeting to users who do not need to log in to a site—better targeting leads to increased revenue;

We can serve different personalized ads on the same IP address;

Audience targeting is faster and easier to analyze;

Can be used in devices with minimal processing power, such as mobile devices;

The mapping/grouping cluster will be small in size, therefore selecting the most relevant targeted ads can be processed faster.

FIG. 1 Hardware Embodiment.

Referring now in specific detail to the drawings, and particularly FIG. 1, there is provided a simplified pictorial illustration of an information processing system for ad targeting in which the present invention may be implemented. For purposes of this invention, computer system 100 may represent any type of computer, information processing system or other programmable electronic device, including a client computer, a server computer, a portable computer, an embedded controller, a personal digital assistant, and so on. The computer system 100 may be a stand-alone device or networked into a larger system. Computer system 100, illustrated for exemplary purposes as a networked computing device, is in communication with other networked computing devices (not shown) via network 110. As will be appreciated by those of ordinary skill in the art, network 110 may be embodied using conventional networking technologies and may include one or more of the following: local area networks, wide area networks, intranets, public Internet and the like.

In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 110. However, for ease of understanding, aspects of the invention have been embodied in a single computing device-computer system 100.

Computer system 100 includes processing device 102 which communicates with an input/output subsystem 106, memory 104, storage 110 and network 110. The processor device 102 is operably coupled with a communication infrastructure 122 (e.g., a communications bus, cross-over bar, or network). The processor device 102 may be a general or special purpose microprocessor operating under control of computer program instructions 132 executed from memory 104 on program data 134. The processor 102 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 104 may be partitioned or otherwise mapped to reflect the boundaries of the various memory subcomponents. Memory 104 may include both volatile and persistent memory for the storage of: operational instructions 132 for execution by CPU 102, data registers, application storage and the like. Memory 104 preferably includes a combination of random access memory (RAM), read only memory (ROM) and persistent memory such as that provided by a hard disk drive 118. The computer instructions/applications that are stored in memory 104 are executed by processor 102. The computer instructions/applications 132 and program data 134 can also be stored in hard disk drive 118 for execution by processor device 102. Memory 104.

Those skilled in the art will appreciate that the functionality implemented within the blocks illustrated in the diagram may be implemented as separate components or the functionality of several or all of the blocks may be implemented within a single component. The I/O subsystem 106 may comprise various end user interfaces such as a display, a keyboards, and a mouse. The I/O subsystem 106 may further comprise a connection to a network 190 such as a local-area network (LAN) or wide-area network (WAN) such as the Internet.

The computer system 100 may also include a removable storage drive 110, representing a floppy disk drive, a magnetic tape drive, an optical disk drive, etc. The removable storage drive 110 reads from and/or writes to a removable storage unit 120 in a manner well known to those having ordinary skill in the art. Removable storage unit 120, represents a floppy disk, a compact disc, magnetic tape, optical disk, CD-ROM, DVD-ROM, etc. which is read by and written to by removable storage drive 110. As will be appreciated, the removable storage unit 120 includes a non-transitory computer readable medium having stored therein computer software and/or data.

The computer system 100 may also include a communications interface 112. Communications interface 112 allows software and data to be transferred between the computer system and external devices. Examples of communications interface 112 may include a modem, a network interface (such as an Ethernet card), a communications port, a PCM-CIA slot and card, etc. Software and data transferred via communications interface 112 are in the form of signals which may be, for example, electronic, electromagnetic, optical, or other signals capable of being received by communications interface 112.

In this document, the terms "computer program medium," "computer usable medium," and "computer readable medium" are used to generally refer to both transitory and non-transitory media such as main memory 104, removable storage drive 120, a hard disk installed in hard disk drive 118, and signals. These computer program products are means for providing software to the computer system 100. The computer readable medium 120 allows the computer system 100 to read data, instructions, messages or message packets, and other computer readable information from the computer readable medium 120.

Use Cases.

Some of the applicable use cases are: 1) a family using all the Internet connected devices in a house; 2) Starbuck's coffee shop with regular customers visiting the same location; 3) University/library with the same students using their computers all year long; and 4) Airport with constant travelers using the available Wi-Fi. In situation number 1), the system acts as a cluster detector. Some clusters are easy to identify, such as a family in the same Geo location that share a set of similar devices without logging in.

In other scenarios such as the airport scenario 4), isolation and identification of users is much more difficult. In such a case, we isolate a common location (the airport) and within this common location we further isolate a small set of people that are employed there but check on their computer accounts (this will be similar to the family scenario) and this is designated as Cluster 1. Then there is a huge set of users that use the particular service in the specific space (common location), like the passengers. Then, among these passengers there are the frequent flyers and the system will determine this as a cluster through redundancy. If the system can detect that a particular person logs in to their account from time to time while flying, then that user will be put into cluster 2 and then for each user the system will try to identify the user by the set of factors defined in the system.

Figure 3:
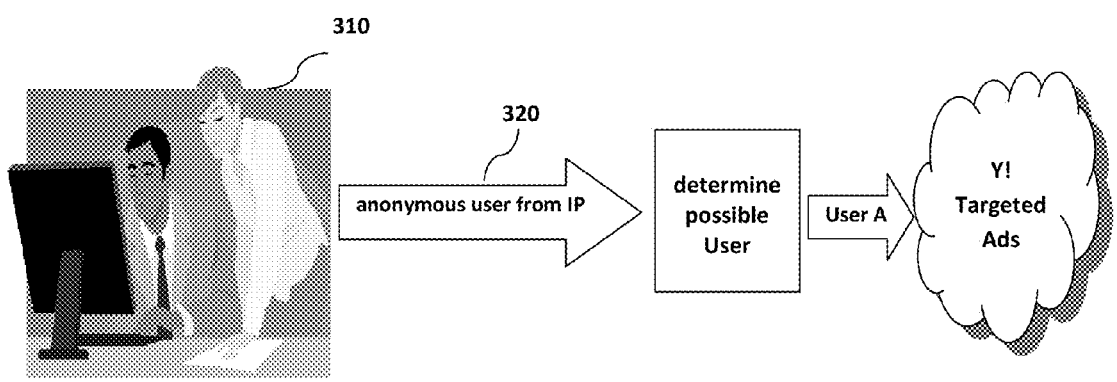
FIG. 3 is a simplified depiction of a process flow for directed ad targeting, according to an embodiment of the present invention.

We know that different members of a household tend to use Internet gateways in detectable patterns of use. Additionally, with extensive personalization of devices (an iPad is much less likely shared than a desktop), there is a great opportunity for tracking Web activity across a shared access point that relates people and ties their interests together. By tracking the Web activity of different users, we are able to identify activity that occurs across multiple devices that may or may not be tied to a single user or a single IP address. This information is then leveraged for ad targeting. Referring to FIG. 3, we show a common use case 300 of multiple users 310, perhaps in the same household, accessing the Internet through one IP address or gateway 320. By tracking the Internet requests from this common gateway 320, we are able to identify a specific user (user A) without user A having to log in and specify his/her identity. This user can be targeted to receive ads specifically directed toward the derived likes/preferences/habits of that user.

As an example, we envision a family of four: dad, mom, boy, and girl sharing the same Internet access devices in a household through one modem (gateway). With numerous Internet devices in the house, many of them not requiring a user to log in to his/her profile, how can we track who is using what? For example, one device is a blue ray player. Ideally, the ads shown when the boy is using the blue ray device should be different than the ads shown when the mom is using it. So we specify a way for disaggregating the data aggregated from the gateway, and then use the result to identify and select who is using the device without the user logging in to it. When the user logs in at later point, we validate the selection.

Logs.

We track and aggregate multiple parameters of Internet use to create an Internet Access Log 400 (see FIG. 4). Access Logs can indicate requests coming from the same shared access point which can be used to track activity of multiple users. This data is aggregated and learned over time. From this Internet Access Log 400, we then disaggregate and disambiguate the individual log entries to map users to Internet use in a Master Log 500 (see FIG. 5). This Master Log 500 can be a "family interest table" with each member having a commonality index to the extent he/she is tied in to the table. This aggregated information can then be used to target common ads or ads that relate to mutually interesting interests such as sharing gifts, premium/paid web content, and so forth. In this way we are able to identify the users even if they do not log in. The Internet use parameters in the Activity Log 400 include: a) websites accessed; b) time of access; c) device used; d) applications; and e) activity trends. Once we know which user is accessing the Internet, we are able to specifically target advertisements to individuals within a crowd, household, café, or organization.

Internet Use Parameters.

Websites Accessed. Every person has a set of sites that they access at any time, these are sites that tend to apply to the person's interest, for example in a family of 4 (mom, dad, boy, girl), the dad will access finance sites, the boy football sites, the mom shopping site and the girl music site. Taking this in mind, the system can keep a log and track the sites accessed, then can lock down on the identified user.

Activity Trends. These are trends of how the person uses the internet while online, like the font used for typing, and the arrangement of their applications. For example, we know that in a household personal computer, each user has his/her own login. Once the user logs in to the PC, a set of applications are initiated upon start-up. When any of these application connect to the Internet (such as McAfee anti-virus) we are able to record the use of these particular applications. The applications that are launched at start-up, as well as the order in which they are launched, can serve to identify the particular user.

Time of use. This is the time that the user uses the internet, adding to this the user profile, the system can use fuzzy logic to identify and/or filter out the users. for example in a family of 4 (mom, dad, boy, girl), the Dad works and typically is on-line at night (he won't be home during the day), the mom doesn't work so she can be on-line at any time, The girl is in school and used the web to study, turn in homework, chat with friends the Boy is in grade school and uses the web to play games, read about sports. So if the user is using the internet at 10 am, by filtration and matching, the system will identify the Mom as the family member on-line, and from past interests knows to target ads related to shopping coupons locally.

Device. The type of device in use can make individual identification easier. For example if the user is using a certain mobile device, the system will learn of the individual based on their past usage of that device at the current particular location.

Method Embodiment

Figure 2:
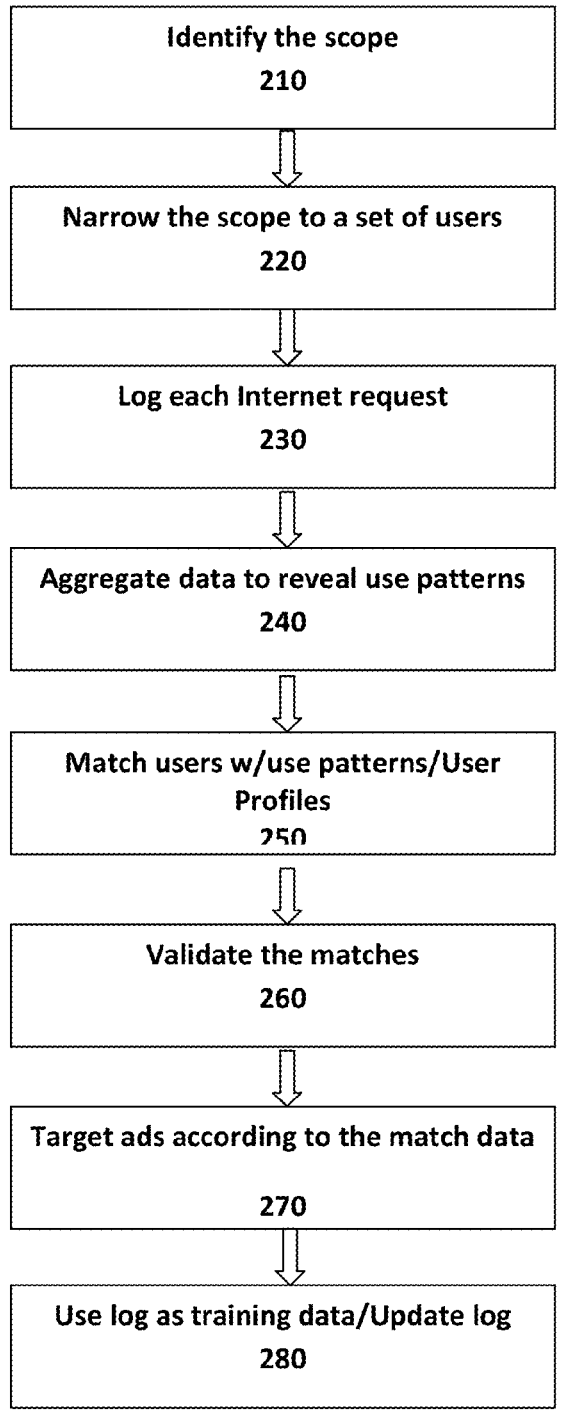
FIG. 2 is a flowchart of a method for directed ad targeting, according to an embodiment of the present invention.

In FIG. 2 we show a flowchart 200 of a method for targeting ads according to an embodiment of the present invention. First, in step 210 we need to identify the scope, or area, on which we will focus. This can be a house, coffee shop, restaurant, or other place likely to contain multiple users. Then in step 220 we narrow the scope to one particular set of users. For a house, this can be the members of the household. For a coffee shop this can be a local community of 200 Internet users. Note that at this point we have not identified the individual users, just the general group to which the users belong.

In ongoing step 230 we log each Web request for every user into a Web Access Log 400. We record data such as time in/out, websites visited, device used, applications used, and the organization of the applications. In FIG. 4 we show a sample Web Access log 400. In step 240 we aggregate the data to reveal use patterns. We then disaggregate the data and record it in a Master Log 500 which allows us to identify users by matching requests with their use patterns in step 250. We use this Master Log 500 to create profiles for the identified users. This profile is used to understand the user's likes and dislikes in order to target specific, relevant ads to that user.

In order to confirm that our matches are correct, in step 260 for every ad conversion and/or user login, we confirm or refute our matches. We can also use geo location from a cell phone to identify a user to confirm a match. Additionally, if the user accesses an account with identifying metadata, we can trace that back to the user who initially linked to the account and thus identify the user. Next, we are able to target ads according to the verified match data in step 270. It is important to constantly update the Master Log. Additionally, we use the Master Log 500 as training data for use patterns.

We separate the method into three different depths of difficulty:

Depth of difficulty 1. This is best represented by a family using all the Internet connected devices in a house. Different members of a household tend to use the gateways in patterns. Additionally, with extensive personalization of devices, the device in use identifies the user.

Depth of difficulty 2. One could also easily scale this idea to public Wi-Fi spaces where users of the facility might have common interests. A great example of where this can be useful is Y!'s tie-up with Starbucks. One can easily conjecture and track via access logs, common ad interests for Starbuck's users when they are in a Starbucks facility. One could think of other locations such as University/city/public libraries where people of a particular town with a certain intellectual capacity gather who might have specific interest in local events, coupons, etc. that can be exploited for targeting ads.

Depth of difficulty 3. One can scale this up even further to access at airports, for example, providing interesting information in relation to food outlets in a particular terminal, premium luggage/legroom services from airlines, and so forth. This is accomplished by first identifying a common location and then identifying clusters within that common location. We then tag a user as belonging to a specific cluster. Then, based on the location for any user within a cluster that connects to the Internet without logging in to their account, we can cross-check the cluster and depending on the users' habits and access point, we can identify them and furthermore target ads to them.

In another embodiment of the invention, we track Web activity across a shared access point, not just to single out specific users, but to relate people and tie their interests together. Some examples where this could be useful are: family vacations, local events, movie recommendations, and so on. For example, in the domain of shared public Wi-Fi spots such as coffee shops, we can determine common/frequently-occurring user interests and responses for better user targeting as in the case of Y!'s recent tie-up with Starbucks cafes.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method for disaggregating to isolate users for targeting advertisements to a specific user, the method comprising:
   using a processor device configured to perform:
   identifying a location comprising a plurality of users using the Internet;
   isolating a cluster of Internet users within the identified location;
   tracking web activity over time among the cluster of Internet users at the identified location by logging each Internet request from the cluster in a first log;
   aggregating data regarding each Internet request to reveal use patterns, wherein the data comprises a plurality of Internet use parameters recorded for each Internet request;
   disaggregating the data by grouping the data according to the use patterns;
   generating a second log comprising the disaggregated, grouped data;
   using the second log to match a first Internet use pattern with a first Internet user and a second Internet use pattern with a second Internet user different than the first Internet user to:
   identify the first Internet user without a logging in to a site by the first Internet user to specify an identity of the first Internet user; and
   identify the second Internet user without a logging in to the site by the second Internet user to specify an identity of the second Internet user different than the identity of the first Internet user,
   wherein the matching is performed based upon at least one of:
   websites accessed by the first Internet user;
   websites accessed by the second Internet user;
   a first activity trend of the first Internet user;
   a second activity trend of the second Internet user;
   a first time of use of the first Internet user;
   a second time of use of the second Internet user;
   a first device of the first Internet user; or
   a second device of the second Internet user,
   wherein the first Internet user and the second Internet user access the Internet through a same IP address or gateway;
   using geolocation of a mobile device of the first Internet user or the second Internet user to confirm at least one of the match of the first Internet use pattern with the first Internet user or the match of the second Internet use pattern with the second Internet user;
   generating a first profile for the first Internet user and a second profile for the second Internet user using the second log;
   responsive to determining that a first Internet request corresponds to the first Internet user based upon the first Internet use pattern, providing one or more advertisements targeted to the first Internet user based upon the first profile; and
   responsive to determining that a second Internet request corresponds to the second Internet user based upon the second Internet use pattern, providing one or more advertisements targeted to the second Internet user based upon the second profile.

2. The method of claim 1 wherein the web activity comprises one or more Internet requests received from two or more devices.

3. The method of claim 1, wherein the site performs the matching.

4. The method of claim 1 further comprising updating the second log with Internet activity, wherein the Internet activity comprises a user login.

5. The method of claim 1 wherein the web activity comprises one or more Internet requests received from three or more devices.

6. The method of claim 1 wherein the first profile is different than the second profile.

7. The method of claim 1 wherein the one or more advertisements targeted to the first Internet user are different than the one or more advertisements targeted to the second Internet user.

8. An information processing system for disaggregating to isolate users for targeting advertisements to a specific user, the system comprising:
   a memory; and
   a processor device operably coupled to the memory and executing instructions to:
      identify a location comprising a plurality of users using the Internet;
      isolate a cluster of Internet users within the identified location;
      track web activity over time among the cluster of Internet users at the identified location by logging each Internet request from the cluster in a first log;
      aggregate data regarding each Internet request to reveal use patterns, wherein the data comprises a plurality of Internet use parameters recorded for each Internet request;
      disaggregate the data by grouping the data according to the use patterns;
      generate a second log comprising the disaggregated, grouped data;
      use the second log to match a first Internet use pattern with a first Internet user and a second Internet use pattern with a second Internet user different than the first Internet user:
         without a logging in to a site by the first Internet user; and
         without a logging in to the site by the second Internet user,
      wherein the matching is performed based upon at least one of:
         websites accessed by the first Internet user;
         websites accessed by the second Internet user;
         a first activity trend of the first Internet user;
         a second activity trend of the second Internet user;
         a first time of use of the first Internet user;
         a second time of use of the second Internet user;
         a first device of the first Internet user; or
         a second device of the second Internet user,
      wherein the first Internet user and the second Internet user access the Internet through a same IP address or gateway;
      generate a first profile for the first Internet user and a second profile for the second Internet user using the second log;
      responsive to determining that a first Internet request corresponds to the first Internet user based upon the first Internet use pattern, provide one or more advertisements targeted to the first Internet user based upon the first profile; and
      responsive to determining that a second Internet request corresponds to the second Internet user based upon the second Internet use pattern, provide one or more advertisements targeted to the second Internet user based upon the second profile.

9. The information processing system of claim 8 wherein the first profile corresponds to likes and dislikes of the first Internet user and the second profile corresponds to likes and dislikes of the second Internet user.

10. The information processing system of claim 8 wherein the processor device further updates the second log with Internet activity, wherein the Internet activity comprises an advertisement conversion.

11. The information processing system of claim 8 wherein the processor device further updates the second log with Internet activity, wherein the Internet activity comprises a user login.

12. The information processing system of claim 8 wherein the web activity comprises one or more Internet requests received from two or more devices.

13. The information processing system of claim 8 wherein the first profile is different than the second profile.

14. The information processing system of claim 8 wherein the one or more advertisements targeted to the first Internet user are different than the one or more advertisements targeted to the second Internet user.

15. A computer program product comprising a non-transitory computer readable storage medium comprising instructions that, when executed by a processor device, cause a computer to:
   track web activity among a cluster of Internet users by logging one or more Internet requests from the cluster;
   use the web activity to match a first Internet use pattern with a first Internet user and a second Internet use pattern with a second Internet user different than the first Internet user at least one of:
      without a logging in to a site by the first Internet user to specify an identity of the first Internet user; or
      without a logging in to the site by the second Internet user to specify an identity of the second Internet user different than the identity of the first Internet user,
   wherein the matching is performed based upon at least one of:
      websites accessed by the first Internet user;
      websites accessed by the second Internet user;
      a first activity trend of the first Internet user;
      a second activity trend of the second Internet user;
      a first time of use of the first Internet user;
      a second time of use of the second Internet user;
      a first device of the first Internet user; or
      a second device of the second Internet user;
   generate a first profile for the first Internet user and a second profile for the second Internet user;
   responsive to determining that a first Internet request corresponds to the first Internet user based upon the first Internet use pattern, provide content targeted to the first Internet user based upon the first profile; and
   responsive to determining that a second Internet request corresponds to the second Internet user based upon the second Internet use pattern, provide content targeted to the second Internet user based upon the second profile.

16. The computer program product of claim 15 wherein the one or more Internet requests are received from two or more devices.

17. The computer program product of claim 15 wherein the cluster of internet users comprises three or more Internet users.

18. The computer program product of claim 15 wherein the cluster of internet users comprises four or more Internet users.

19. The computer program product of claim 15 wherein the first profile is different than the second profile.

20. The computer program product of claim 15 wherein the content targeted to the first Internet user is different than the content targeted to the second Internet user.

* * * * *